United States Patent
Mak et al.

(10) Patent No.: US 9,548,812 B2
(45) Date of Patent: *Jan. 17, 2017

(54) METHOD AND APPARATUS FOR SUB-CARRIER FREQUENCY CONTROL

(71) Applicant: Ciena Corporation, Hanover, MD (US)

(72) Inventors: Gary Mak, San Francisco, CA (US); Edgar Velez, Kanata (CA)

(73) Assignee: Ciena Corporation, Hanover, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/097,569

(22) Filed: Apr. 13, 2016

(65) Prior Publication Data

US 2016/0233954 A1    Aug. 11, 2016

Related U.S. Application Data

(63) Continuation of application No. 12/433,316, filed on Apr. 30, 2009, now Pat. No. 9,344,307.

(51) Int. Cl.
| | | |
|---|---|---|
| H04B 10/079 | (2013.01) | |
| H04L 25/02 | (2006.01) | |
| H04L 27/00 | (2006.01) | |
| H04L 27/22 | (2006.01) | |
| H04J 14/02 | (2006.01) | |
| H04L 5/00 | (2006.01) | |

(52) U.S. Cl.
CPC .......... *H04B 10/0795* (2013.01); *H04J 14/02* (2013.01); *H04L 5/003* (2013.01); *H04L 25/022* (2013.01); *H04L 27/0014* (2013.01); *H04L 27/223* (2013.01)

(58) Field of Classification Search
CPC ............... H04B 10/0795; H04L 25/022; H04L 27/0014; H04L 27/223; H04L 5/003; H04J 14/02

See application file for complete search history.

(56) References Cited

U.S. PATENT DOCUMENTS

| | | | | |
|---|---|---|---|---|
| 4,907,237 | A * | 3/1990 | Dahmani | H01S 5/14 372/18 |
| 6,678,441 | B1 * | 1/2004 | Taylor | G02B 6/12007 356/519 |
| 2003/0128917 | A1 | 7/2003 | Turpin et al. | |
| 2005/0025220 | A1 | 2/2005 | Laroia et al. | |
| 2008/0101417 | A1 | 5/2008 | Chapman et al. | |
| 2009/0110401 | A1 * | 4/2009 | Sakharov | H04J 14/0201 398/79 |

FOREIGN PATENT DOCUMENTS

WO    2007064241 A1    6/2007

OTHER PUBLICATIONS

International Search Report issued Aug. 9, 2010 for International Patent Application No. PCT/CA2010/000616.
Sun, et al., "Real-time measurements of a 40 Gb/s coherent system", Optics Express vol. 16, No. 2, Jan. 21, 2008, pp. 1-7.

* cited by examiner

*Primary Examiner* — Ajay Cattungal
(74) *Attorney, Agent, or Firm* — Clements Bernard PLLC; Christopher L. Bernard; Lawrence A. Baratta, Jr.

(57) ABSTRACT

The invention pertains to methods, apparatus, and systems for controlling the sub-carrier frequencies in an optical frequency division multiplex communication system by using a metric available from the sub-carrier modem's digital receive block as an indicator of cross-talk between sub-carriers and adjusting the sub-carrier frequency separation as a function of that metric.

20 Claims, 10 Drawing Sheets

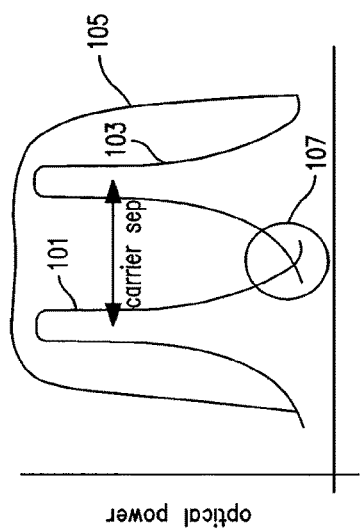
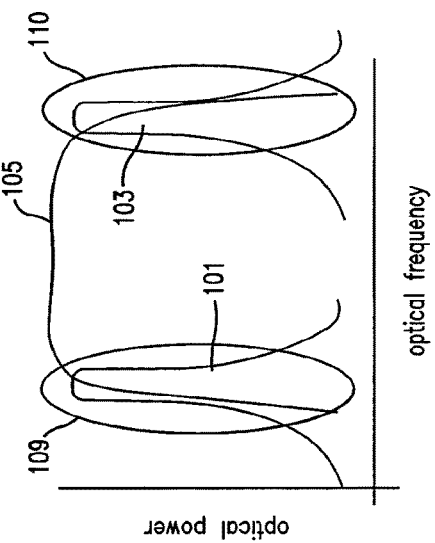
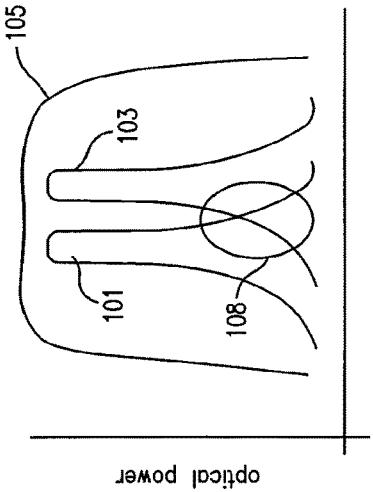
FIG. 1A
FIG. 1B
FIG. 1C

METHOD AND APPARATUS FOR SUB-CARRIER FREQUENCY CONTROL

CROSS-REFERENCE TO RELATED APPLICATION(S)

The present patent/application is a continuation of U.S. patent application Ser. No. 12/433,316, filed Apr. 30, 2009, and entitled "METHOD AND APPARATUS FOR SUB-CARRIER FREQUENCY CONTROL," the contents of which are incorporated by reference.

FIELD OF THE DISCLOSURE

The invention pertains to communication systems. More particularly, the invention pertains to systems and methods for maximizing performance in a frequency division multiplexed fiber optic communication system.

BACKGROUND OF THE INVENTION

One technique commonly used in optical and other communication systems to maximize the amount of data that can be transmitted and/or received per unit time (i.e., bandwidth) is frequency division multiplexing. In frequency division multiplexing, separate data signals are modulated onto different wavelengths and transmitted simultaneously over the same fiber. A plurality of data signals carried on different light wavelengths (hereinafter sometimes referred to as sub-carriers or sub-carrier channels) can be simultaneously transmitted on the same fiber without the signals on the different wavelengths interfering with each other and can be separated from each other at a receiving end using filters and/or other techniques. One of the advantages of fiber optic communication systems is that the lasers used therein to transmit the data generate light in extremely well-contained and narrow wavelength bands, thus facilitating the use of frequency division multiplexing. It often is desirable for the wavelength channels to be as close to each other as possible without interfering with each other in order to maximize the number of different wavelength channels in a given communication network. On the other hand, there is some wavelength diversity or spread in any designated wavelength carrier. The spread can be due to many factors, but is primarily due to the modulated information signal. Accordingly, in optical frequency division multiplexing, the spacing between adjacent carrier wavelengths should be selected in order to avoid or minimize cross-talk between the signals in two different wavelength channels.

In any event, most, if not all, fiber optic communication systems employ optical band pass filters to block noise outside of the wavelength range that is used for communications in the system. Typically, the band defined by such optical band pass filters is relatively tight around the wavelength range supported by the system. Thus, in a system using frequency division multiplexing, the cutoff frequency at the low end of the optical band pass filter is relatively close to the lowest frequency sub-carrier and the upper cutoff of the optical band pass filter is relatively close to the highest frequency sub-carrier supported by the system.

For instance, FIG. 1A is a graph of optical power as a function of optical frequency (1/wavelength) for an exemplary communication system using two sub-carrier wavelengths. The spectrum of the first, lower sub-carrier frequency is represented by trace 101 and the spectrum of the second, higher frequency sub-carrier is represented by trace 103. The frequency response of the optical band pass filter is represented by trace 105. FIG. 1A shows a relatively ideal situation in which the frequency envelope of the first and second carrier frequencies 101, 103 are spaced far enough from each other that there is very little frequency overlap between the two channels (as seen within area 107 of the graph) and the full spectrums of the two channels are virtually fully contained within the frequency envelope 105 of the optical band pass filter. In this example, there will be virtually no cross-talk between the two sub-carriers and virtually all of the power of the sub-carriers 101, 103 will pass through the optical filter.

Turning now FIG. 1B, this figure illustrates a situation in which the frequencies of the two sub-carrier channels 101, 103 are too closely spaced to each other such that there is significant overlap of the frequency spectrums of the two channels (as seen within area 108). This will cause significant cross-talk between the two sub-carriers, resulting in poor communication quality (i.e., a high bit error rate (BER)) due to interference between the two channels.

FIG. 1C illustrates a contrasting problem. Particularly, FIG. 1C illustrates a situation in which the sub-carrier channels 101, 103 are spaced too far apart. As can be seen in FIG. 1C, there is no cross-talk, but a substantial amount of the spectrum of each of the sub-carriers is outside of the band 105 of the band pass filter (as seen within areas 109 and 110), thus resulting in the loss of a substantial amount of data (i.e., a high bit error rate (BER)).

SUMMARY OF THE INVENTION

The invention pertains to methods, apparatus, and systems for controlling the sub-carrier frequencies in an optical frequency division multiplexed (OFDM) communication system by using a metric available from the sub-carrier modem's digital receive block as an indicator of cross-talk between sub-carriers and adjusting the sub-carrier frequency separation as a function of that metric.

In an exemplary embodiment, a method implemented in a modem for sub-carrier frequency control in a system that uses at least a first sub-carrier frequency and a second sub-carrier frequency includes, responsive to receiving signals on each of the first sub-carrier frequency and the second sub-carrier frequency, determining a metric indicative of frequency separation between the first sub-carrier frequency and the second sub-carrier frequency based on digital processing of each of the first sub-carrier frequency and the second sub-carrier frequency; controlling a frequency of at least one of the first sub-carrier frequency and the second sub-carrier frequency based on the metric; and processing the received signals on each of the first sub-carrier frequency and the second sub-carrier frequency at a common data processing equipment in the modem. The metric can be an indicator of cross-talk between the first sub-carrier frequency and the second sub-carrier frequency and is determined digitally. The metric can be based on one or more of a spectrum measurement, a bit error rate measurement, and a crosstalk measurement. The metric can be an attenuation at a given selected frequency spacing from a center frequency of one of the first sub-carrier frequency and the second sub-carrier frequency which correlates highly with carrier separation. The metric can be determined as a function of a plurality of different values. The controlling can include adjusting laser frequencies associated with one or more of the first sub-carrier frequency and the second sub-carrier frequency.

In another exemplary embodiment, a digital processing apparatus in a modem for sub-carrier frequency control includes circuitry, responsive to receiving signals on each of the first sub-carrier frequency and the second sub-carrier frequency, adapted to determine a metric indicative of frequency separation between the first sub-carrier frequency and the second sub-carrier frequency based on digital processing of the signals on each of the first sub-carrier frequency and the second sub-carrier frequency; circuitry adapted to control a frequency of at least one of the first sub-carrier frequency and the second sub-carrier frequency based on the metric; and circuitry adapted to process the received signals on each of the first sub-carrier frequency and the second sub-carrier frequency at a common data processing equipment in the modem. The metric can be an indicator of cross-talk between the first sub-carrier frequency and the second sub-carrier frequency and is determined digitally. The metric can be based on one or more of a spectrum measurement, a bit error rate measurement, and a crosstalk measurement. The metric can be an attenuation at a given selected frequency spacing from a center frequency of one of the first sub-carrier frequency and the second sub-carrier frequency which correlates highly with carrier separation. The metric can be determined as a function of a plurality of different values. The frequency can be controlled by adjustment of laser frequencies associated with one or more of the first sub-carrier frequency and the second sub-carrier frequency.

In a further exemplary embodiment, a modem adapted for sub-carrier frequency control includes a first sub-carrier subsystem adapted to receive a first signal on a first sub-carrier frequency; a second sub-carrier subsystem adapted to receive a second signal on a second sub-carrier frequency; common data processing equipment adapted to process both the first signal and the second signal; and a controller communicatively coupled to the first sub-carrier subsystem and second first sub-carrier subsystem, wherein the controller is adapted to, responsive to receiving signals on each of the first sub-carrier frequency and the second sub-carrier frequency, determine a metric indicative of frequency separation between the first sub-carrier frequency and the second sub-carrier frequency based on digital processing of the signals on each of the first sub-carrier frequency and the second sub-carrier frequency, and cause control a frequency of at least one of the first sub-carrier frequency and the second sub-carrier frequency based on the metric. The metric can be an indicator of cross-talk between the first sub-carrier frequency and the second sub-carrier frequency and is determined digitally. The metric can be based on one or more of a spectrum measurement, a bit error rate measurement, and a crosstalk measurement. The metric can be an attenuation at a given selected frequency spacing from a center frequency of one of the first sub-carrier frequency and the second sub-carrier frequency which correlates highly with carrier separation. The metric can be determined as a function of a plurality of different values.

In an exemplary embodiment, a method of controlling frequency separation between adjacent carrier frequencies in a frequency division multiplexed communication system that uses at least first and second carrier frequencies subsystems includes receiving a first receive signal on a first carrier frequency subsystem for the first carrier frequency; receiving a second receive signal on a second carrier frequency subsystem for the second carrier frequency; obtaining a metric from at least the first receive signal indicative of a frequency separation between the first and second carrier frequencies, wherein the metric is obtained from a digital receive block based on digital processing of the first receive signal on the first carrier frequency subsystem and the second receive signal on the second carrier frequency subsystem; and controlling the frequency of at least one of the first and second carrier frequency subsystems as a function of the metric by adjusting a frequency of one or more transmitting lasers; wherein the first receive signal and the second receive signal are received and transmitted at a common data processing apparatus as digital data, in a same modem. The frequency division multiplexed communication system can be an optical communication system. The metric can be indicative of cross-talk between the first receive signal and the second receive signal. The metric can be a function of at least a frequency response of a digital adaptive filter in a receive path of at least one of the first and second carrier frequency subsystems.

The metric can be a function of at least the attenuation of the digital adaptive filter at a particular frequency spacing from a center frequency of the first carrier frequency subsystem. The metric can comprise a first metric that is derived from data available in the digital receive block of the first carrier frequency subsystem and a second metric derived from data available in a digital receive block of the second carrier frequency subsystem. The frequency can be controlled as an OR function of the first and second metrics. The metric can be a function of a bit error rate in at least one of the first and second carrier frequency subsystems. The metric can be a second-order or differential metric. The metric can be a function of at least a derivative of the frequency response. The metric can be a function of a spectrum response of at least one of the first and second carrier frequency subsystems. Obtaining the metric can comprise deriving a first value from data available in the first carrier frequency subsystem; shifting a frequency of at least the first carrier frequency subsystem; deriving a second value from data available in the first carrier frequency subsystem after the frequency shifting; returning the at least first carrier frequency subsystem to the first frequency; and calculating a differential between the first and second values.

The frequency division multiplexed communication system can be a coherent optical frequency division multiplexed communication system comprising a plurality of nodes, each node having a modem having a first carrier frequency subsystem and a second carrier frequency subsystem, wherein the first carrier frequency subsystems of all of the nodes are locked to a first frequency and the second carrier frequency subsystem of all of the nodes are locked to a second frequency and wherein the first and second receive signals are transmitted from a first node and received at a second node and the metric is used to control at least one of the first and second carrier frequency subsystems at the second node. The frequency division multiplexed communication system can comprise a plurality of nodes, each node having a modem having a first carrier frequency subsystem and a second carrier frequency subsystem and wherein the first and second receive signals are transmitted from a first node and received at a second node and the controlling further comprises transmitting a control signal from the second node to the first node, the control signal indicating a manner in which the first node should adjust the frequency of at least one of the first node's first and second carrier frequency subsystem, and the first node adjusting at least one of the first node's first and second carrier frequency subsystems as a function of the control signal. The method can further comprise transmitting a first transmit signal at the first carrier frequency; transmitting a second transmit signal at the second carrier frequency; and reflecting the first and second transmit signals whereby the first receive signal is the reflected first transmit signal and the second receive signal is the reflected second transmit signal.

In another exemplary embodiment, an apparatus for controlling the frequency separation between adjacent carrier frequencies in a frequency division multiplexed communication system having at least first and second carrier frequency bands includes a first carrier frequency subsystem having a transmit portion including a laser and a receive portion, the receive portion adapted to receive signals in the first carrier frequency band; a second carrier frequency subsystem having a transmit portion including a laser and a receive portion, the receive portion adapted to receive signals in the second carrier frequency band; each of the receive portions of the first and second carrier frequency subsystems generating a signal containing information indicative of a frequency separation between the first and second carrier frequencies, wherein the first carrier frequency band signals and the second carrier frequency band signals are received and transmitted at a common data processing apparatus as digital data; a controller coupled to receive the signals from the first and second carrier frequency subsystems; the controller adapted to obtain a metric from the signals from the first and second carrier frequency subsystems, the metric indicative of a frequency separation between the first and second carrier frequencies, and generate at least one control signal for adjusting the frequency of the laser of at least one of the first and second carrier frequency subsystems, wherein the metric is obtained from a digital receive block based on digital processing of the received signals in the first carrier frequency band and the second carrier frequency band, in a same modem; the controller being coupled to provide the at least one control signal to at least one of the transmitting lasers of the first and second carrier frequency subsystems.

The frequency division multiplexed communication system can be an optical communication system. The metric can be indicative of cross-talk between the first receive signal and the second receive signal. The metric can be a function of at least a frequency response of a digital adaptive filter in at least one of the first and second carrier frequency subsystems. The metric can be the attenuation of the digital adaptive filter at a particular frequency separation from a center frequency of the first carrier frequency subsystem. The metric can comprise at least a first metric that is obtained from signals received by the first carrier frequency subsystem and a second metric that is obtained from signals received by the second carrier frequency subsystem. The controller can be adapted to obtain the metric by: deriving a first value as a function of data available in the first carrier frequency subsystem; shifting a frequency of at least the first carrier frequency subsystem; deriving a second value as a function of data available in the first carrier frequency subsystem after the frequency shifting; returning the at least first carrier frequency subsystem to the first frequency; and calculating a differential between the first and second values.

In another exemplary embodiment, a controller for controlling the frequency separation between adjacent carrier frequencies in a frequency division multiplexed communication system having at least first and second carrier frequency subsystems includes a common digital processing apparatus, in a modem, adapted to: receive a signal from at least one of the first and second carrier frequency subsystems as digital data; derive a metric from the signal from at least one of the first and second carrier frequency subsystems, the metric indicative of a frequency separation between the first and second carrier frequencies and generate at least one control signal for adjusting the frequency of the laser of at least one of the first and second carrier frequency subsystems, wherein the metric is obtained from a digital receive block based on digital processing of the received signal from the first carrier frequency subsystem and the received signal from the second carrier frequency in the modem; and provide the at least one control signal to at least one of the transmitting lasers of the first and second carrier frequency subsystems.

BRIEF DESCRIPTION OF THE DRAWINGS

FIGS. 1A-1C are graphs illustrating exemplary sub-carrier frequencies spacings in an optical frequency division multiplexed communication system.

DETAILED DESCRIPTION OF THE PREFERRED EMBODIMENTS

Figure 2:
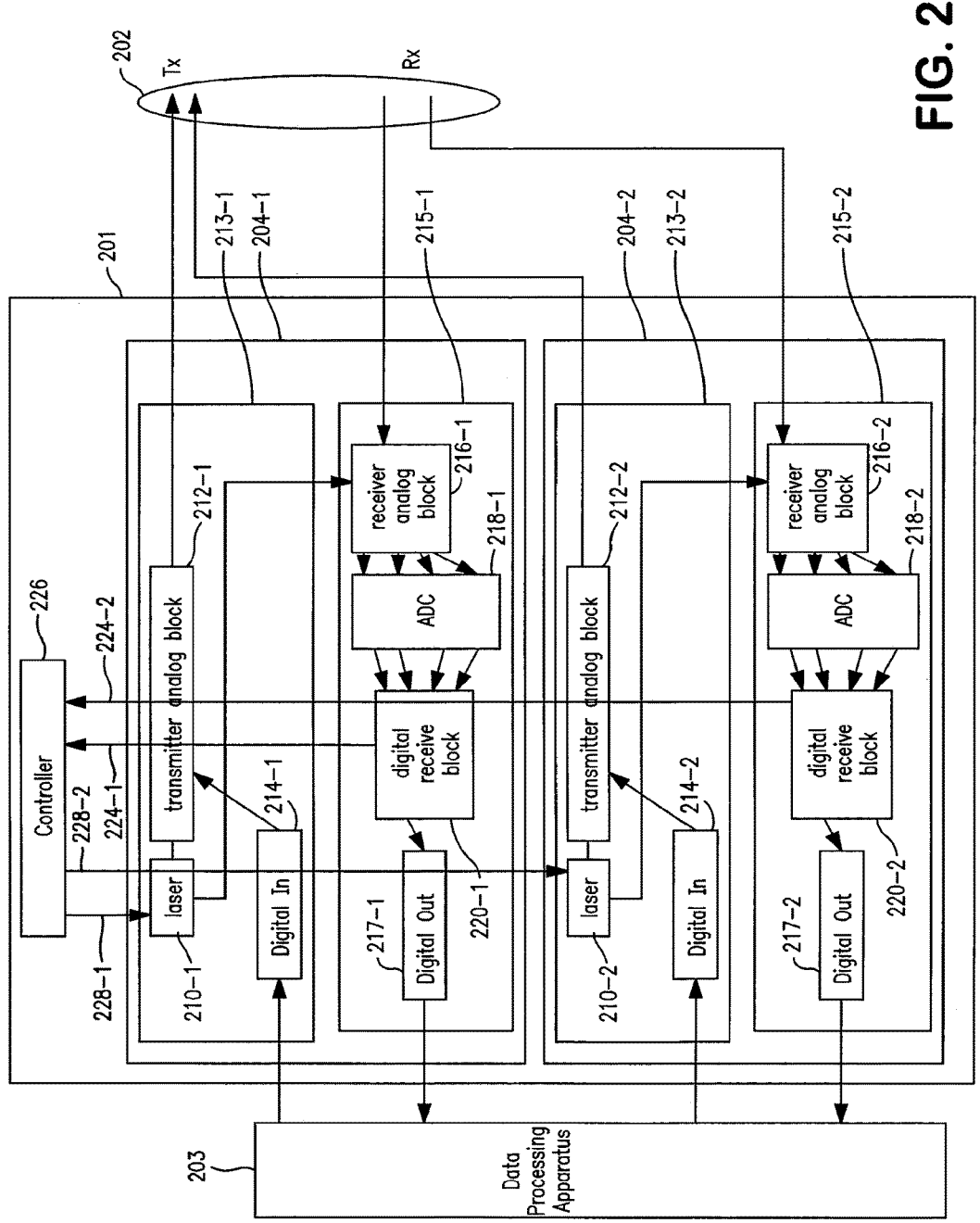
FIG. 2 is a block diagram illustrating an optical modem in accordance with the principles of the present invention.

FIG. 2 is a block diagram illustrating an optical modem in accordance with the principles of the present invention. In order to simplify the discussion and best illustrate the principles of most interest, the illustrated embodiment concerns a modem for use in an optical frequency division multiplexed communication system having only two transport wavelengths (i.e., sub-carriers). However, it should be understood that is merely exemplary and that the present invention can be applied to a system supporting any number of wavelength sub-carriers.

The modem 201 essentially is the front end of a transceiver on the network. One side of the modem is connected to the fiber transport system 202 (e.g., an optical fiber of a network) and the other side of the modem 201 is connected to data processing equipment 203 that processes data received via the network and/or generates any data for transmission over the network. The modem comprises a plurality of sub-carrier subsystems 204-1, 204-2, one for each sub-carrier channel (only two in this simple example) that are largely identical to each other except for the particular frequency to which the transmitter and receiver components are tuned in each subsystem.

Thus, using the first sub-carrier subsystem 204-1 as an example, it comprises a transmitter portion 213-1 and a receiver portion 215-1. The transmitter portion includes a laser light source 210-1 that generates the light at that particular sub-carrier's wavelength that will be used to transmit data onto the network. The output of the laser is fed into a transmitter analog block 212-1. The job of the transmitter analog block is to accept digital transmit data 214-1 from the processing apparatus 203 and modulate the output of the laser 210-1 in accordance with the digital transmit data 214-1. The output of the transmitter analog block 212-1 is coupled to an optical fiber 202 of the network.

In the receiver portion 215-1, the optical fiber 202 of the network is coupled to a receiver analog block 216-1. The receiver analog block 216-1 receives the carrier signal from the laser 210-1, which is used to demodulate the receive signal to baseband. The receive analog block 214-1 also conditions the analog data received over the fiber 202 and forwards it to an analog to digital conversion system 218-1 that converts the baseband analog data into digital data. That digital data is forwarded to a digital receive block 220-1 that further conditions the data digitally before the digital out data 217-1 is passed on to the data processing apparatus 203 (which will use the digital data for whatever purpose is relevant to its function). The conditioning processes performed in the digital receive block 220-1 typically include bit error detection and correction and/or digital filtering.

The other sub-carrier subsystem 204-2 of the modem is essentially identical to the first sub-carrier subsystem 204-1 described hereinabove except, of course, it is tuned to the second sub-carrier frequency.

Figure 3A:
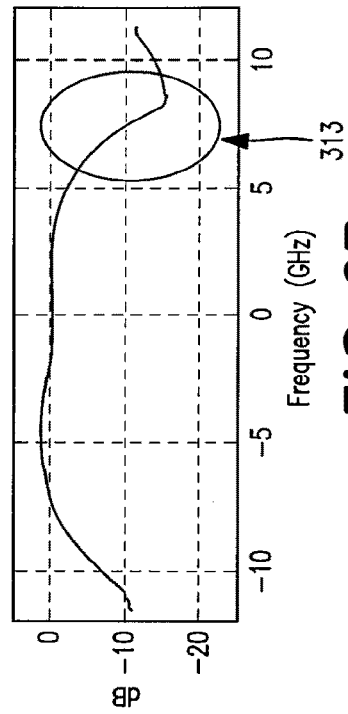
FIGS. 3A, 3B, and 3C are graphs illustrating a typical frequency response of a digital adaptive filter for sub-carrier for the various exemplary sub-carrier frequency spacing conditions shown in FIGS. 1A, 1B, and 1C, respectively.

As is well known in the art, it is common in the digital receive block 220-1 to apply some means of adaptively adjusting parameters within the digital receive block to minimize the bit error rate (BER). This often takes the form of a digital adaptive filter, such as a finite impulse response (FIR) filter with a feedback optimization loop to adjust the frequency response of the filter to minimize BER. For instance, FIG. 3A illustrates the frequency response of a digital adaptive filter when the bit error rate is minimal (e.g., the situation shown in FIG. 1A). The graph in FIG. 3A shows that the digital adaptive filter has essentially no attenuation at the center frequency of the particular sub-carrier. (Note that the graph assumes that the data signals have been demodulated to baseband, and thus the desired center frequency on the X axis is represented as 0 Hz and the surrounding frequencies are represented as offsets from the center frequency). However, as one travels in either direction away from the desired sub-carrier center frequency, the filter starts to attenuate (or filter) the signals. In the example illustrated in FIG. 3A, it can be seen that attenuation is significant at 10 GHz below the center frequency (at least 10 dB) as well as at 10 GHz above the center frequency (about 10 dB).

Figure 3B:
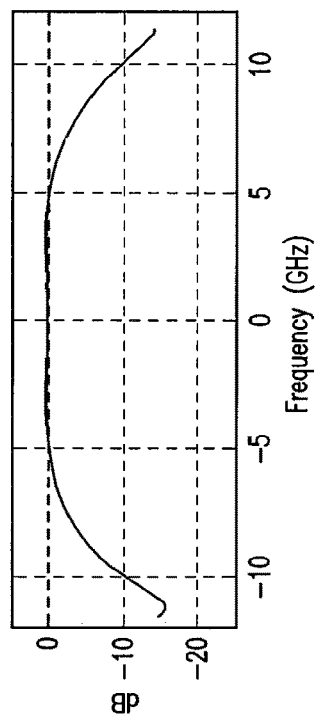

FIG. 3B, on the other hand, illustrates a typical frequency response of a digital adaptive filter when two adjacent sub-carriers are too close to each other in frequency such that there is a substantial amount of cross-talk between the sub-carrier and the next higher frequency sub-carrier (shorter wavelength). For instance, this may be the expected frequency response of a digital adaptive filter for the lower frequency sub-carrier 101 illustrated in FIG. 1B, in which the two adjacent sub-carriers are too close to each other such that cross-talk is high. As can be seen in FIG. 3B, the frequency response to the left of center frequency, (lower frequencies) where there is no interference from an adjacent channel, remains relatively the same as in FIG. 3A. However, to the right of the center frequency (higher frequencies), the frequency response of the filter changes significantly (see the portion of the frequency response shown in area 313). As can be seen, between about +5 to +10 GHz above center frequency, the attenuation is increased substantially as compared to FIG. 3A to help reduce the bit error rate by reducing the cross-talk.

While the increased attenuation in the range of 5 to 10 GHz above the center frequency will tend to minimize the interference signal from the adjacent channel, it will also cut off some of the desired signal from this channel. However, the digital adaptive filter will settle on a frequency response that achieves the best compromise (i.e., the lowest bit error rate) between these two counterveiling goals.

It should be apparent to persons of skill in the related arts that the frequency response of the digital adaptive filter in the sub-carrier subsystem for the higher frequency illustrated in FIG. 1B, for instance, might look like the mirror image (about the center frequency) of what is shown in FIG. 3B. That is, the attenuation to the left of the center frequency would be increased in the range of −5 to −10 GHz from center frequency, while the frequency response above the center frequency, where there is no interference from an adjacent channel, remains relatively the same as in FIG. 3A.

Figure 3C:
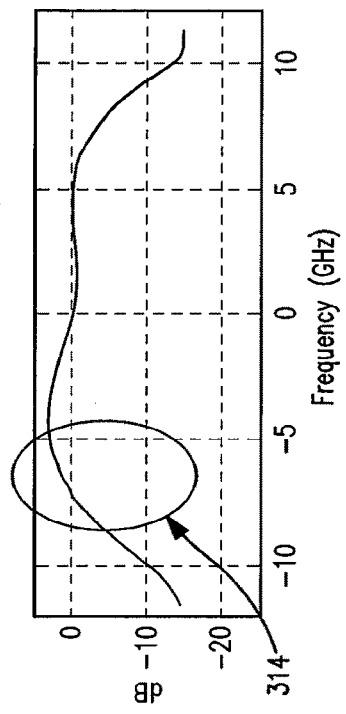

Finally, in order to be complete, FIG. 3C illustrates a typical frequency response of a digital adaptive filter when the lower sub-carrier frequency is too low such that there is very low cross-talk with the adjacent, higher frequency sub-carrier channel, but the lower frequencies of the channel are cut off by the spectrum filter of the system (e.g., the situation illustrated in FIG. 1C). As can be seen in FIG. 3C, gain is increased (i.e., attenuation is decreased) near the lower frequency end of the channel (see the portion of the frequency response in area 314) in an attempt to improve reception quality, but the frequency response to the right side of center frequency is essentially unchanged from the response of FIG. 3A. This is because, in this situation, (1) there will be increased bit error rate due to the cut off by the spectrum filter of the lower portion of the sub carrier and (2) there is no cross-talk above the center frequency affecting bit error rate.

As should be apparent from FIGS. 3A-3C and the preceding discussion, at least a portion of the frequency response of the digital adaptive filter is highly dependent on cross-talk which, in turn, is highly dependent on the frequency separation between adjacent sub-carriers. Accordingly, a metric derived from the digital receive block, of which the frequency response of the digital adaptive filter (or a portion of it) is an example, can be used as an indicator of frequency separation between two adjacent sub-carriers and used to control the frequency separation of the sub-carriers in the communication system.

Thus, returning to FIG. 2, a metric derived from signal quality information available in the digital receive blocks 220-1 and/or 220-2 that is indicative of frequency separation between two adjacent sub-carriers is forwarded from each digital receive block 220-1, 220-2 via lines 224-1 and/or 224-2 to a frequency separation controller 226. The frequency separation controller 226 controls one of both lasers 210-1, 210-2 via control lines 228-1, 228-2 to adjust their center frequencies as a function of this metric.

The metric may be the frequency response of a digital adaptive filter or at least a portion or function of it, as discussed above. However, the metric may be derived from any other information available in the digital receive blocks of the sub-carrier subsystems that is indicative of crosstalk between adjacent channels such as a spectrum measurement, a bit error rate measurement, and/or a crosstalk measurement. It should be understood that various-techniques and mechanisms for performing each of these processes are well known in the related arts and are commonly implemented in digital receive blocks of receivers. It also should be understood that such processes may be performed by digital processors, digital signal processors, software running on a computer or processor, state machines, Application Specific Integrated Circuits (ASICs), Field Programmable Gate Arrays (FPGAs), combinational logic, or other well known means, and various combinations thereof.

For instance, in one embodiment, the metric may be the attenuation at one particular frequency (such as + or −8 GHz as shown in FIGS. 3A-3C) in the frequency response of a digital adaptive filter. For instance, as illustrated in the above-discussed embodiments, the metric may be as simple as the attenuation value at +8 GHz from the center frequency of that sub-carrier as a measure of crosstalk with the next higher frequency channel or −8 GHz from center frequency as a measure of crosstalk with the next lower frequency channel. If the attenuation is higher than a nominal value, then the controller 226 will adjust the laser accordingly.

Figure 4A:
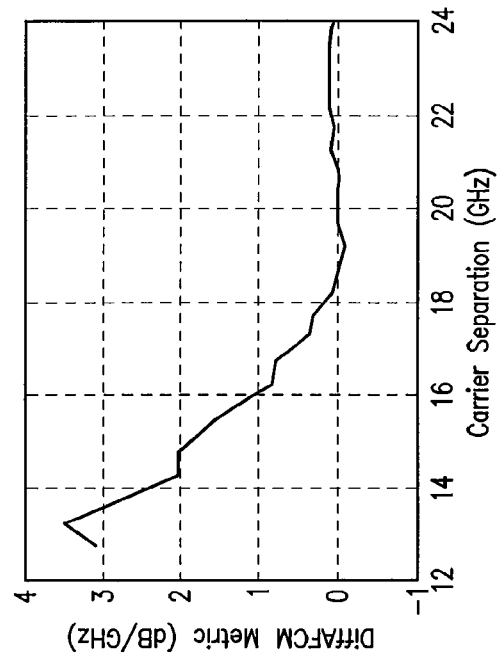
FIG. 4A is a graph illustrating attenuation at +8 GHz from center frequency of a digital adaptive filter as a function of frequency separation to the higher frequency channel of the communication system for a sub-carrier block for a lower frequency sub-carrier in an exemplary two channel frequency division multiplexed communication system.

FIG. 4A is a graph showing the attenuation at a selected frequency, such as +8 GHz from center frequency, as a function of carrier separation. As can be seen, if the two adjacent sub-carriers separation is above approximately +17 GHz center frequency-to-center frequency, there is little to no attenuation (less than 3 dB). This corresponds to the fact that once the two carriers are separated by at least about 17 GHz, there is essentially no cross-talk. The separation can increase beyond that, but it will not affect cross-talk since cross-talk is already essentially zero at 17 GHz separation. However, below 17 GHz separation, it can be seen that attenuation increases as a function of carrier separation. This also makes sense insofar as once the bands of the carrier frequencies start to overlap, the more they overlap, the greater the bit error rate, and, therefore, the greater the attenuation that the digital adaptive filter will apply.

Accordingly, a metric as simple as the attenuation at a given selected frequency spacing from the center frequency of the sub-carrier correlates highly with carrier separation.

The controller 226 may take any reasonable form. In a practical embodiment, it may be a software process running on the microprocessor of the modem. It may be a process running on the same microprocessor that performs the processes of the digital receive block. However, the controller can be any reasonable apparatus, including, but not limited to, a programmed general purpose computer, a microprocessor, a digital signal processor, combinational logic circuitry, a state machine, digital circuitry, analog circuitry, an FPGA, an ASIC, and combinations thereof.

FIG. 2 shows a single controller that controls both sub-carrier subsystems 204-1, 204-2 of the modem 201. This is merely exemplary. However, an advantage of using a single controller to control the frequencies of the lasers of multiple sub-carrier subsystems is that a combination of the data available from digital receive blocks (e.g., 220-1, 220-2) of multiple sub-carrier subsystems can be used as the metric to adjust each of the lasers (e.g., 210-1, 210-2). For instance, using data from both sub-carrier subsystems 204-1, 204-2 in FIG. 2 may provide additional or more accurate information as to the cross-talk between adjacent channels. For instance, it is possible that a high attenuation at +8 GHz in the lower frequency sub-system 204-1 in FIG. 2 might be caused by noise from an external source, rather than crosstalk with the next higher frequency channel. In such a case, the controller may unnecessarily lower the frequency of laser 210-1. This unnecessary adjustment might be avoided by also considering the corresponding data from the higher sub-carrier subsystem 204-2 in making any laser frequency adjustment decision. Particularly, if the high attenuation at +8 GHz in sub-carrier subsystem 204-1 were the result of crosstalk with the signal in sub-carrier subsystem 204-2, then one would expect a similarly high attenuation at −8 GHz in sub-carrier subsystem 204-2. Thus, if it is observed that the attenuation at −8 GHz in sub-carrier subsystem 204-2 is not high, then the high attenuation at +8 GHz in the first channel 204-1 probably is not the result of the two sub-carriers being too close together in frequency and thus no adjustment will be made to lower the frequency of laser 210-1.

In yet other embodiments, there is not necessarily a different metric for each edge of a channel. That is, a single metric per channel may be derived and used as an indicator of cross-talk at both edges of the channel.

On the other hand, there is no restriction to using only one metric per channel per edge. For instance, one may decide to use some combination of the attenuation at +7 GHz and the attenuation at +8 GHz as the metric indicative of cross-talk with the next higher frequency channel. Furthermore, the multiple metrics may not even have the same character. For instance, the metric might be a calculation that combines attenuation at +8 GHz and bit error rate.

Furthermore, in this simple example, there are only two adjacent channels. However, in any communication system using three or more frequency channels, each channel in the system except the lowest frequency channel and the highest frequency channel will actually have two adjacent channels, i.e., one with a higher frequency and one with a lower frequency. In such case, it may be desirable for the controller to use a metric calculated as a function of two different values obtained for those channels, such as one indicative of cross-talk with the next higher frequency channel (e.g., attenuation at +8 GHz from center frequency) and one indicative of crosstalk with the next lower frequency (e.g., attenuation at −8 GHz from center frequency). Even more accurate laser frequency control may be achieved by basing the control of the corresponding laser on multiple pieces of data from each of (1) the corresponding channel, (2) the next higher frequency channel, and (3) the next lower frequency channel.

In a communication system with N frequency channels, there would be N−1 pairs of frequency adjacent sub-carrier subsystems. However, since the quality of the lowest frequency channel and highest frequency channel also may be affected by the overall system spectrum filter (e.g., trace 105 in FIGS. 1A-1C), there actually may be N+1 pairs of adjacent frequency spectrum edges that may affect each other. The altering of the center frequency of any sub-carrier channel to alter cross-talk with an adjacent channel at one edge (e.g., the upper frequency spectrum edge receiving interference from the next higher frequency channel) may affect cross-talk at the opposite edge of that sub-carrier channel's frequency spectrum (the lower frequency edge receiving interference from the next lower frequency channel). Accordingly, in another embodiment, the controller may decide how to collectively adjust the center frequency of all of the sub-carrier lasers as a function of relevant data available from all of the sub-carrier subsystems.

Another option to improve accuracy is to use a metric that is (or is a function of) one or more second-order values. For instance, in one embodiment, the metric used by the controller may be the difference in attenuation as observed at +8 GHz when the corresponding laser is set at two different frequencies. For instance, the attenuation of digital adaptive filter 220-1 at +8 GHz may be observed, then the laser 210-1 may be dithered to a slightly higher (or lower) frequency and the same measurement (i.e., attenuation at +8 GHz) may be taken again (and then returned to its original frequency after the measurement is taken). The differential between the two is calculated and that differential is used as the metric for controlling the laser 210-1.

Figure 4B:
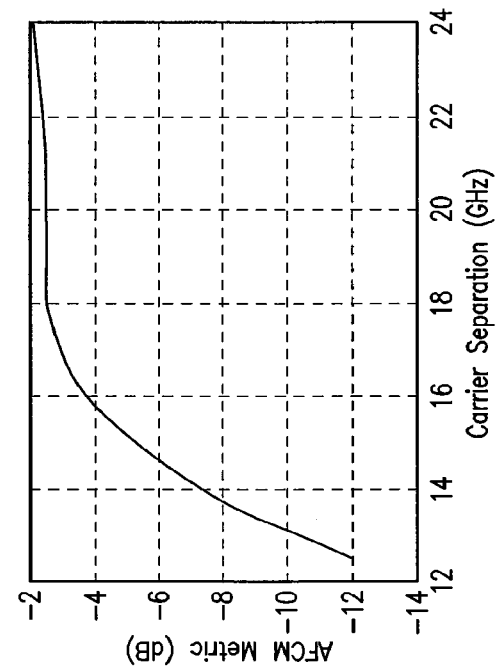
FIG. 4B is a graph illustrating differential attenuation at +8 GHz from center frequency of a digital adaptive filter as a function of frequency separation to the higher frequency channel of the communication system for a sub-carrier block for a lower frequency sub-carrier in an exemplary two channel frequency division multiplexed communication system.

FIG. 4B illustrates the above-described differential metric as a function of carrier separation. Since this metric is a differential measurement, as can be seen in FIG. 4B, it trends in the opposite direction as the straight attenuation measurement illustrated in FIG. 4A. Specifically, at smaller carrier separations such as 13-14 GHz where there would be more cross-talk, the metric is large and it decreases as the carrier separation increases (i.e., as cross-talk decreases). As can be seen, above about 17 GHz, the differential attenuation metric reaches zero and remains flat as separation further increases since further increase in separation has no additional effect on cross-talk when cross-talk is already zero.

Using a differential metric helps eliminate the effect of other causes of change on the frequency response of the filter. Particularly, using such a differential metric should factor out possible causes of change in the selected metric (e.g., the frequency response of a digital adaptive filter) other than change due to the frequency separation between two adjacent frequencies. More particularly, if two measurements are taken very close in time at two different laser frequencies, any difference between those two measurements probably is the result of the change in frequency of the laser as opposed to any other cause. Thus, if there is no change due to the frequency dithering of the laser (i.e., the differential is zero), there is probably no cross-talk between the two channels, regardless of the absolute values of the two attenuation measurements. On the other hand, if the dithering does cause the attenuation measurement to change, then the difference probably is the result of the difference in laser frequency, which, in turn, is probably the result of a change in crosstalk.

In other embodiments, a more complex differential metric may be used. For instance, the metric may be the change in the slope of the adaptive filter response (at a particular frequency, e.g. 8 GHz) as a function of the carrier separation. The slope is the mathematical derivative of the frequency response of a digital adaptive filter.

Figure 5A:
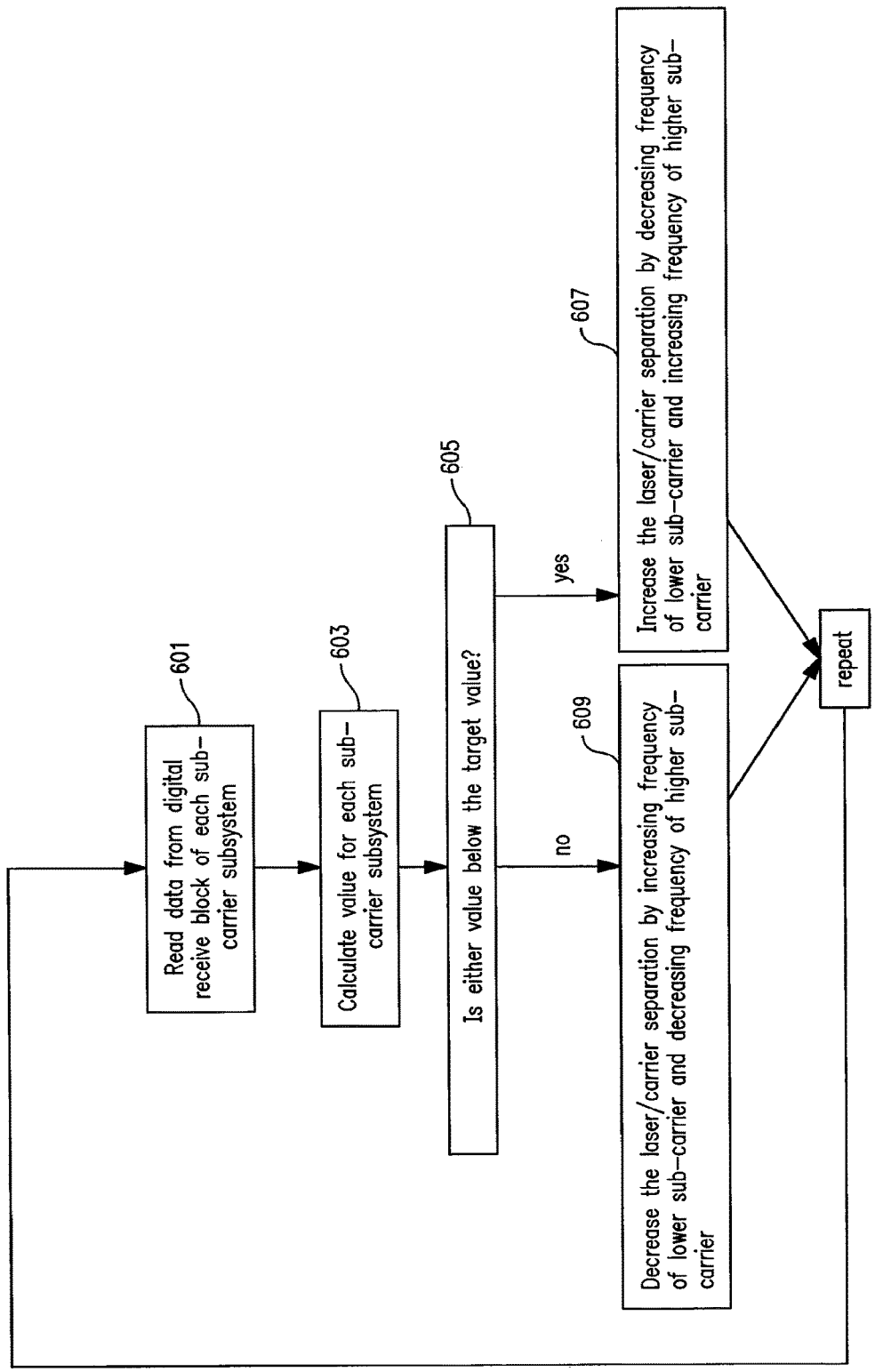
FIG. 5A is a flow diagram illustrating operation of a sub-carrier frequency separation control scheme in accordance with an exemplary embodiment of the present invention.

FIG. 5A is a flow diagram illustrating operation of the controller 226 at FIG. 2 in accordance with one exemplary embodiment, namely, a first order embodiment where the crosstalk data is the attenuation of the digital adaptive filter at a particular frequency and the laser output frequency is controlled as an OR function of the attenuation metrics from two frequency-adjacent sub-carrier digital receive blocks. In step 601, the relevant data from each of the two digital receive blocks 220-1, 220-2 is received by the controller 226. In step 603, the controller calculates the relevant value(s), e.g., the attenuation at +8 GHz, for each of the digital receive blocks. Next, in step 605, the controller makes a decision as to whether the two sub-carriers are too close to each other or too far from each other. For instance, a particular threshold value for attenuation for each of the filters may be selected and the calculated attenuation compared to it. Thus, for instance, if the calculated attenuation in either sub-channel is greater than the threshold (indicating that the channel sub-carriers are too close to each other), then flow proceeds to step 607. In step 607, the controller outputs a control signal to one or both lasers 210-1, 210-2 to increase the frequency separation between the two sub-carrier channels. For example, the controller may issue a command to the lower frequency laser 210-1 to lower its frequency and a command to the higher frequency laser 210-2 to increase its frequency.

On the other hand, if both values are below the predetermined threshold, then flow instead proceeds from step 605 to step 609, where the frequency separation is decreased. As this is a feedback loop, flow then proceeds back to the first step 601 to provide continuous servo control of the frequency separation.

As previously noted, in other embodiments, the output of only one of the digital receive blocks may be used or only one of the lasers may be adjusted. In yet another alteration, a third option may be provided out of decision step 605. For instance, two thresholds may be provided and, if the metric is between the two thresholds, then the laser frequency separation is not changed at all.

Figure 5B:
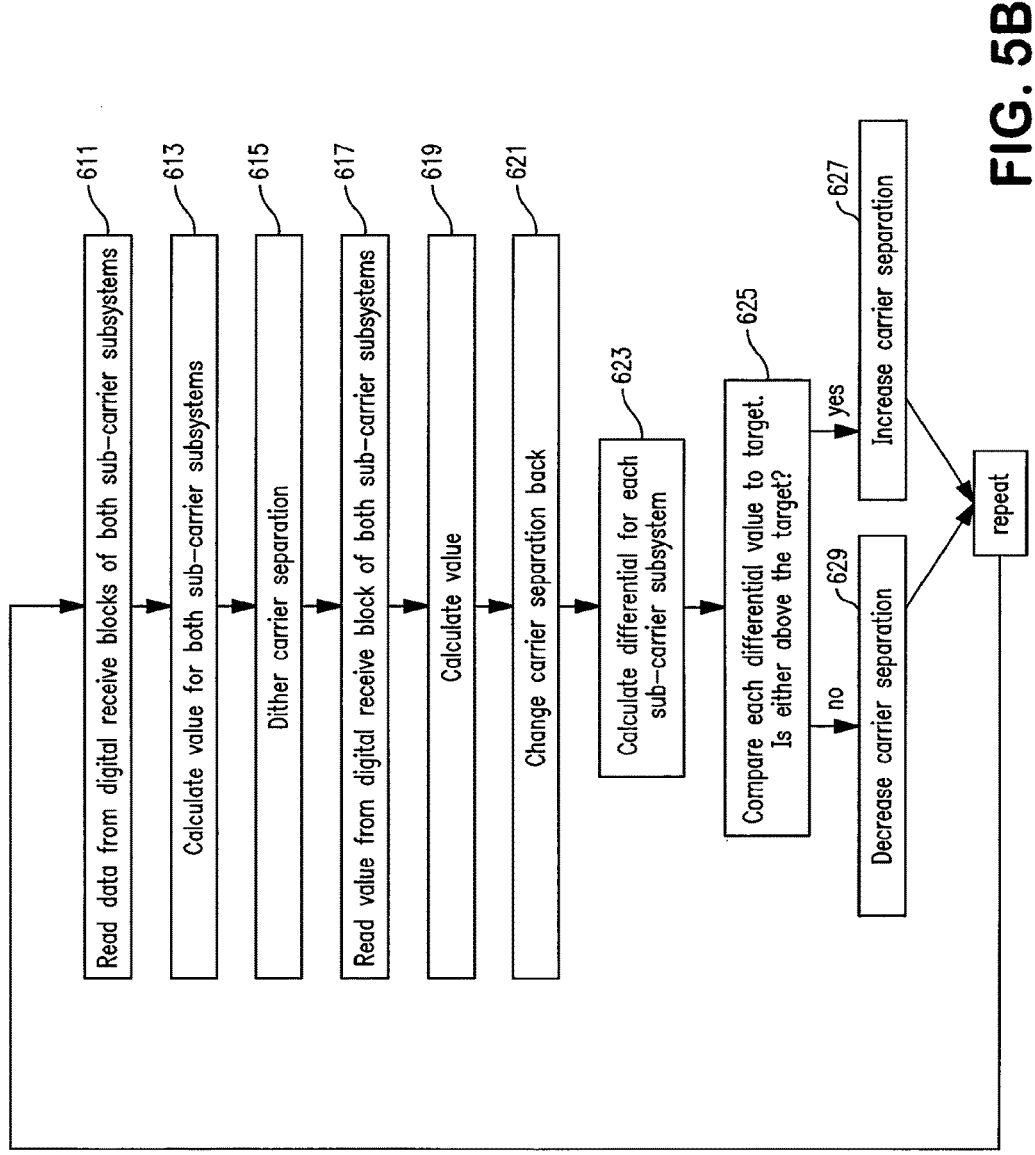
FIG. 5B is flow diagram illustrating operation of a sub-carrier frequency separation control scheme in accordance with another embodiment of the present invention.

FIG. 5B is a flow chart illustrating operation of controller 226 in accordance with an alternative embodiment utilizing a differential metric. The process starts at step 611 in which the controller receives the relevant data from the digital receive blocks 220-1, 220-2 of both sub-carriers. In step 613, the controller calculates the relevant value for each sub-carrier. In step 615, the controller dithers the frequency of one or both of the lasers 210-1, 210-2, e.g., by increasing the separation by 2 GHz. This, for instance, might involve decreasing the frequency of the lower-frequency laser 210-1 by 1 GHz and increasing the frequency of the higher-frequency laser 210-2 by 1 GHz. In step 617, the controller receives the relevant data again from the digital receive blocks of both sub-carriers. In step 619, the controller again calculates the relevant value for each sub-carrier. In step 621 the controller controls the lasers to return back to their original frequencies. Then, in step 623, the differential between the two values is calculated. Next, in step 625, a determination is made as to whether either differential is higher than a threshold value, indicating that the sub-carrier frequencies are too close. If the metric indicates that they are too close together, then flow proceeds to step 627 where the controller increases the carrier separation. On the other hand, if the metric is below the predetermined threshold, then the controller decreases carrier separation. The process returns to step 611 to be repeated continuously.

If the communication system is a coherent optical frequency division multiplexed system, such as the 40 GB/s transmission system developed by Nortel Networks (now Ciena) using Dual-Polarization Quadrature Phase Shift Keying (DP-QPSK) modulation, see, e.g., Sun, H. et al, Real-time measurement of a 40 Gb/s coherent system, Optics Express, Vol. 16 No. 2, Jan. 21, 2008, all of the lasers in the communication system corresponding to a given sub-carrier channel are known to be tuned to the same center frequency (thus the term "coherent"). In such a system, as illustrated in the block diagram of FIG. 2, the metric derived from the signals on the receive port of this particular modem 201 can be used to tune the transmit lasers of the same modem. That is, even though the frequency separation information that is being gathered in the digital receive blocks 220-1, 220-2 is actually information about the frequency separation between the lasers generating the two sub-carrier frequencies at modems of other nodes on the network, it can be used to tune the local transmit lasers 210-1, 210-2. This is because, in a coherent system, all the lasers at al the nodes corresponding to a given sub carrier channel are known to be precisely tuned to the same frequency.

However, in other communication systems where this assumption does not hold, the same principles nevertheless still may be used for sub-carrier frequency control. For instance, in one embodiment, the modem is placed in a test mode in which a reflector is placed at the output terminal of the modem so that the signals transmitted by the local lasers are also received by the local analog receive blocks.

In another embodiment, the laser frequency correction signal generated by the controller 226 at one node of the network can be transmitted over the network to the node at the other end of the link and used by that other node to tune its local lasers.

As previously mentioned, there are a number of different possible metrics that can be used as an indicator of channel separation. The digital receiver blocks of most modems likely already generate for other purposes at least one value that can simply be used directly as the channel separation metric or from which a channel separation metric can readily be derived by the controller. However, it also is possible to generate data solely for purposes of channel separation adjustment.

FIGS. 6, 7, 8, and 9 are block diagrams illustrating a few different embodiments of the invention adapted to use three different measurements commonly available in digital receive blocks of optical frequency division multiplexed telecommunication networks. In these figures, components that are largely identical to components shown in the more general embodiment of FIG. 2 are given the same reference numerals. Components that correspond to each other but are altered relative to each other are designated with the same base number, but with an additional lower case letter.

Figure 6:
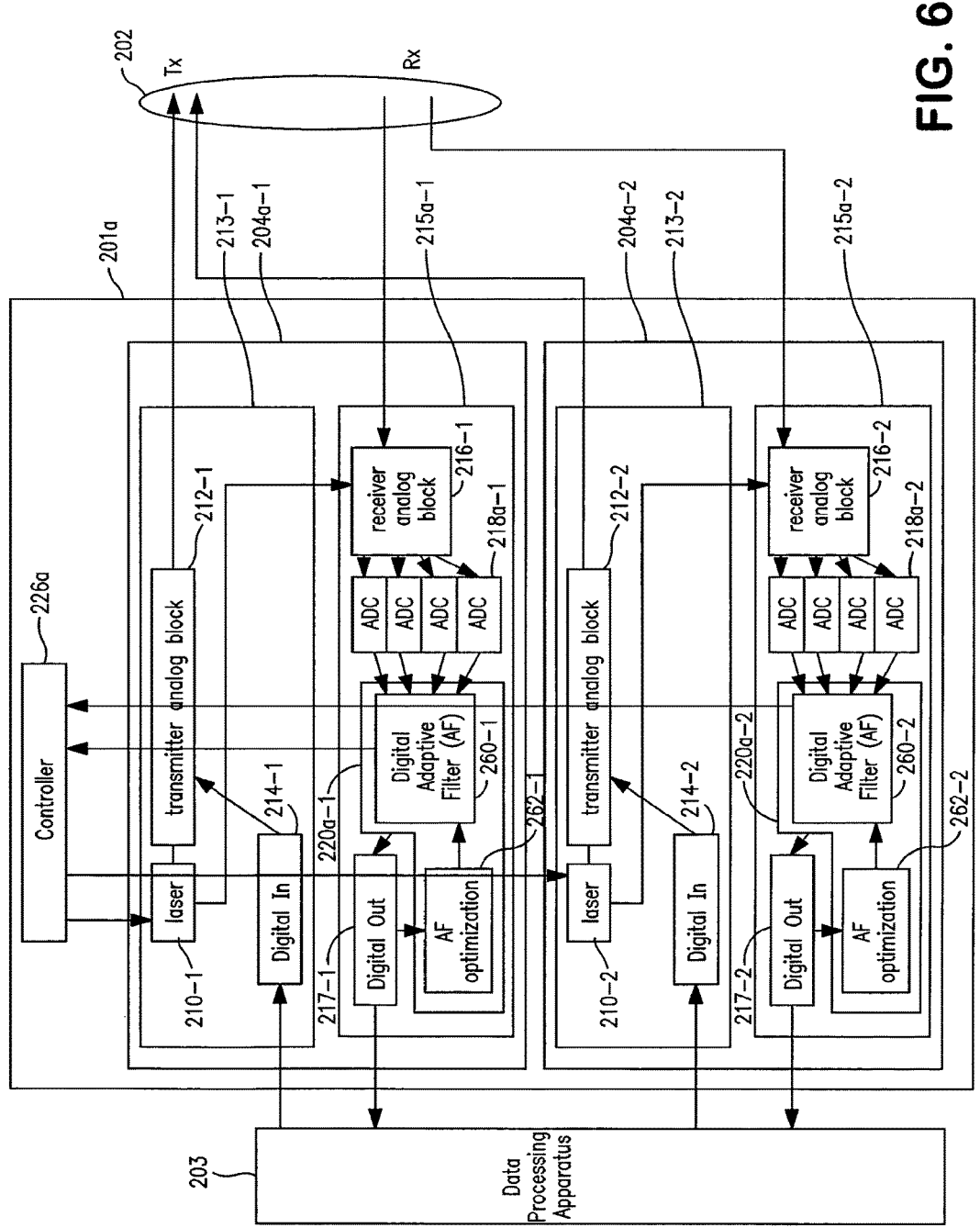
FIG. 6 is a block diagram of an optical modem in accordance with another embodiment of the present invention.

For instance, FIG. 6 illustrates an embodiment already discussed above in which the digital receive blocks 220-1 and 220-2 each include a digital adaptive filter 260-1, 260-2, the frequency responses of which are optimized by an optimization routine 262-1, 262-2 to minimize bit error rate. As previously mentioned, in this embodiment, the frequency response of the digital adaptive filter, or more precisely, a value derived from the frequency response, such as the attenuation at a given frequency, is used as the channel separation metric.

This particular embodiment illustrates an embodiment particularly suited for the aforementioned 40 Gb/s DP-QPSK optical system of Nortel Networks. In this system, for each sub-carrier, there are actually four separate digital data streams comprising complex data (i.e., having a real part and an imaginary part) carried on two different polarizations of the same wavelength carrier. Accordingly, the analog-to-digital conversion blocks 218a-1, 218a-2 comprise four analog-to-digital converters. The operation of this system essentially has already been described. In short, the frequency responses of the digital adaptive filters 260-1 and 260-2 are provided to the controller 226a, which calculates the attenuation at +8 GHz for filter 260-1 and at −8 GHz for filter 260-2 and sends a control signal to each of lasers 210-1, 210-2 to increase frequency separation if either value is over a predetermined threshold value. Otherwise, controller 226a decreases the frequency separation.

Figure 7:
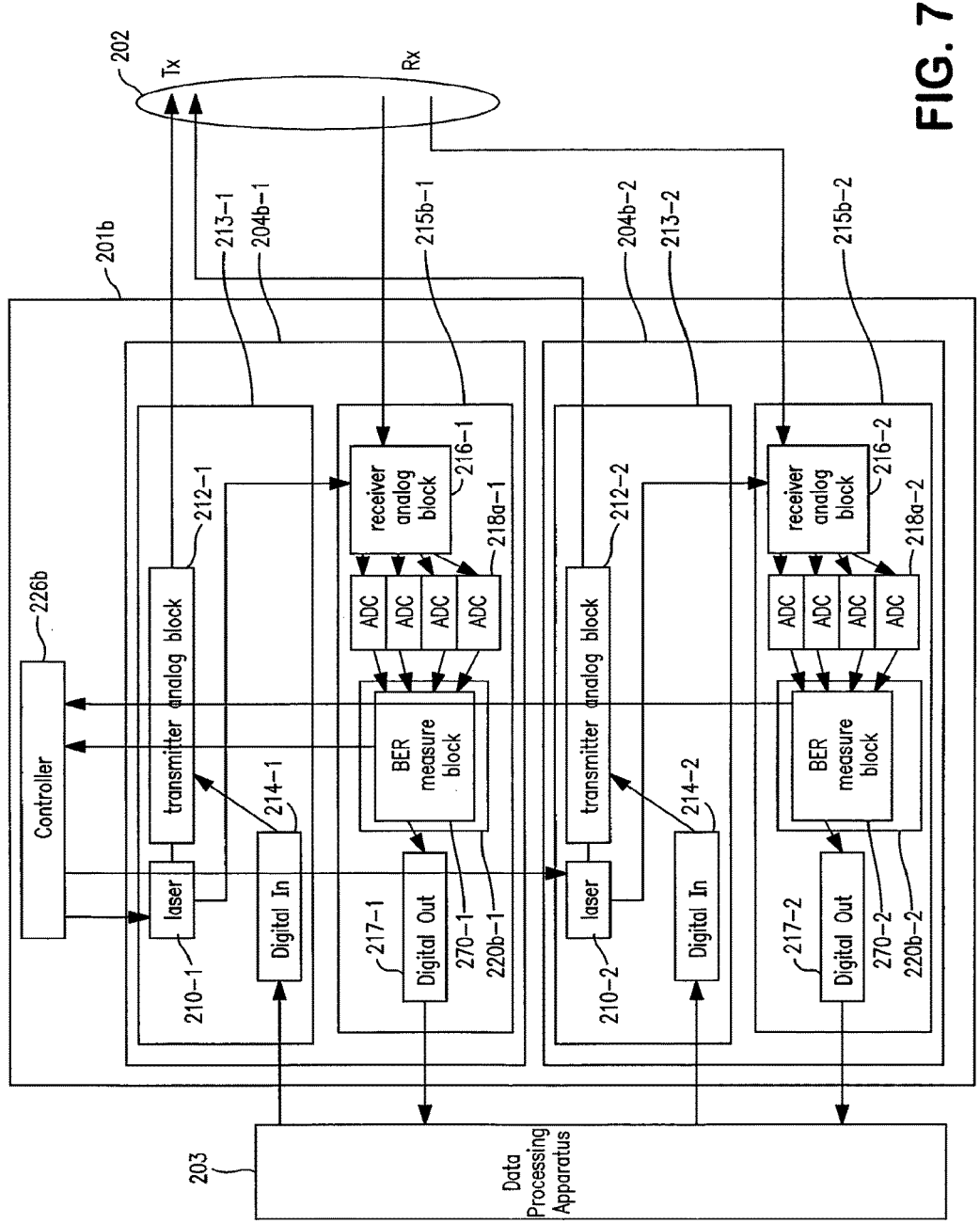
FIG. 7 is a block diagram of an optical modem in accordance with yet another embodiment of the present invention.

FIG. 7 illustrates another embodiment in which the digital receive blocks 220b-1, 220b-2 include bit error rate (BER) measurement processes 270-1, 270-2. The bit error rate itself may be used directly as reasonably correlated to the cross-talk between the channels. Specifically, the higher the bit error rate, the more cross-talk between the channels (and thus the closer the center frequencies of the two sub-carriers are to each other).

Figure 8:
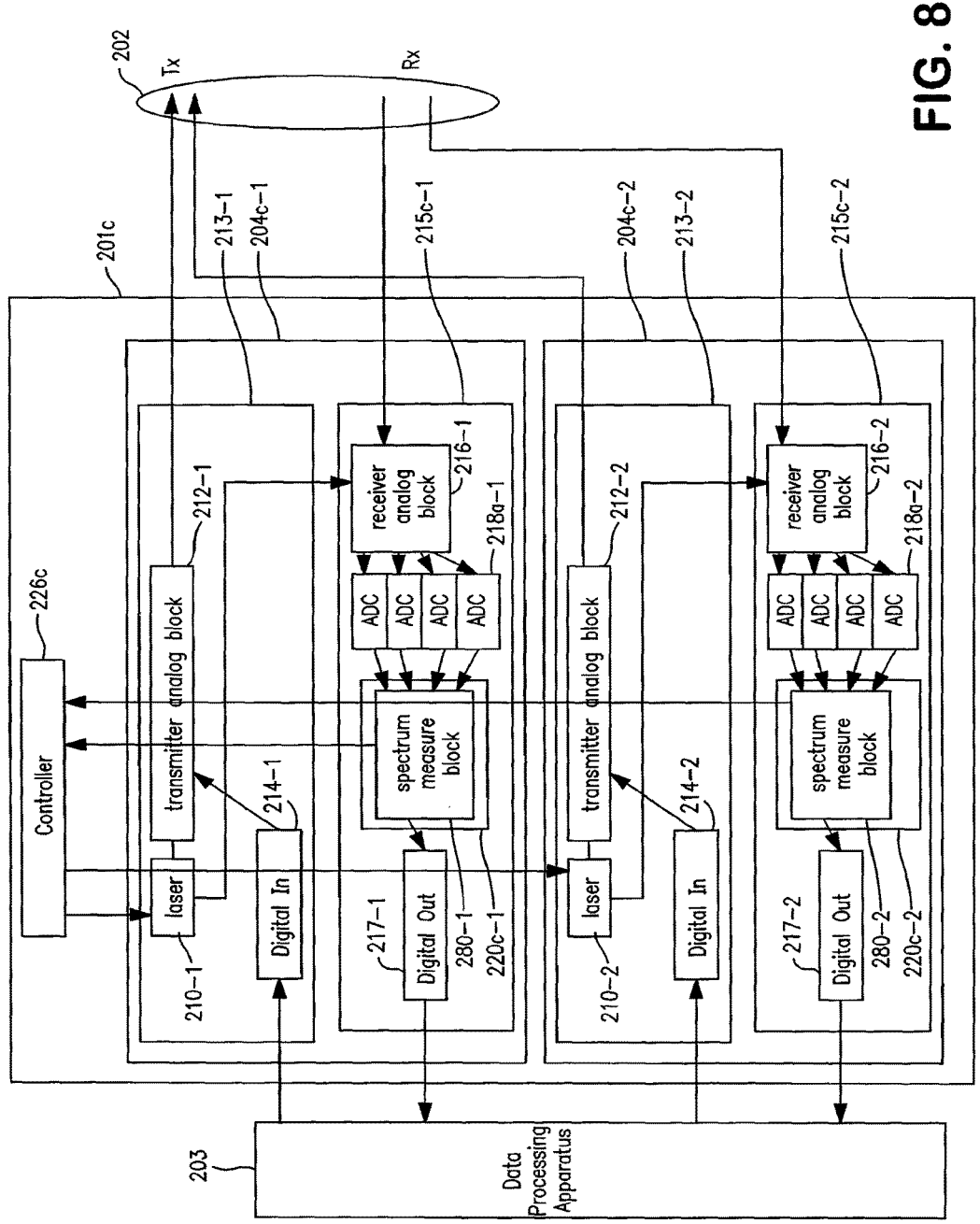
FIG. 8 is a block diagram of an optical modem in accordance with a further embodiment of the present invention.

FIG. 8 illustrates a third embodiment. In this embodiment, the digital receive blocks 220c-1, 220c-2 include a spectrum measurement process, 280-1, 280-2. Each spectrum measurement block takes N consecutive samples of each of four data streams (real and imaginary at two different polarizations) and calculates a spectrum response. For a given sub-carrier, when the adjacent sub-carrier is too close, the cross-talk appears as extra power in the spectrum response in the frequency range where the two adjacent sub-carrier channels overlap. Accordingly, the power at, for instance, +8 GHz for the lower frequency sub-carrier and/or −8 GHz for the higher frequency sub-carrier may be used as the metric.

Figure 9:
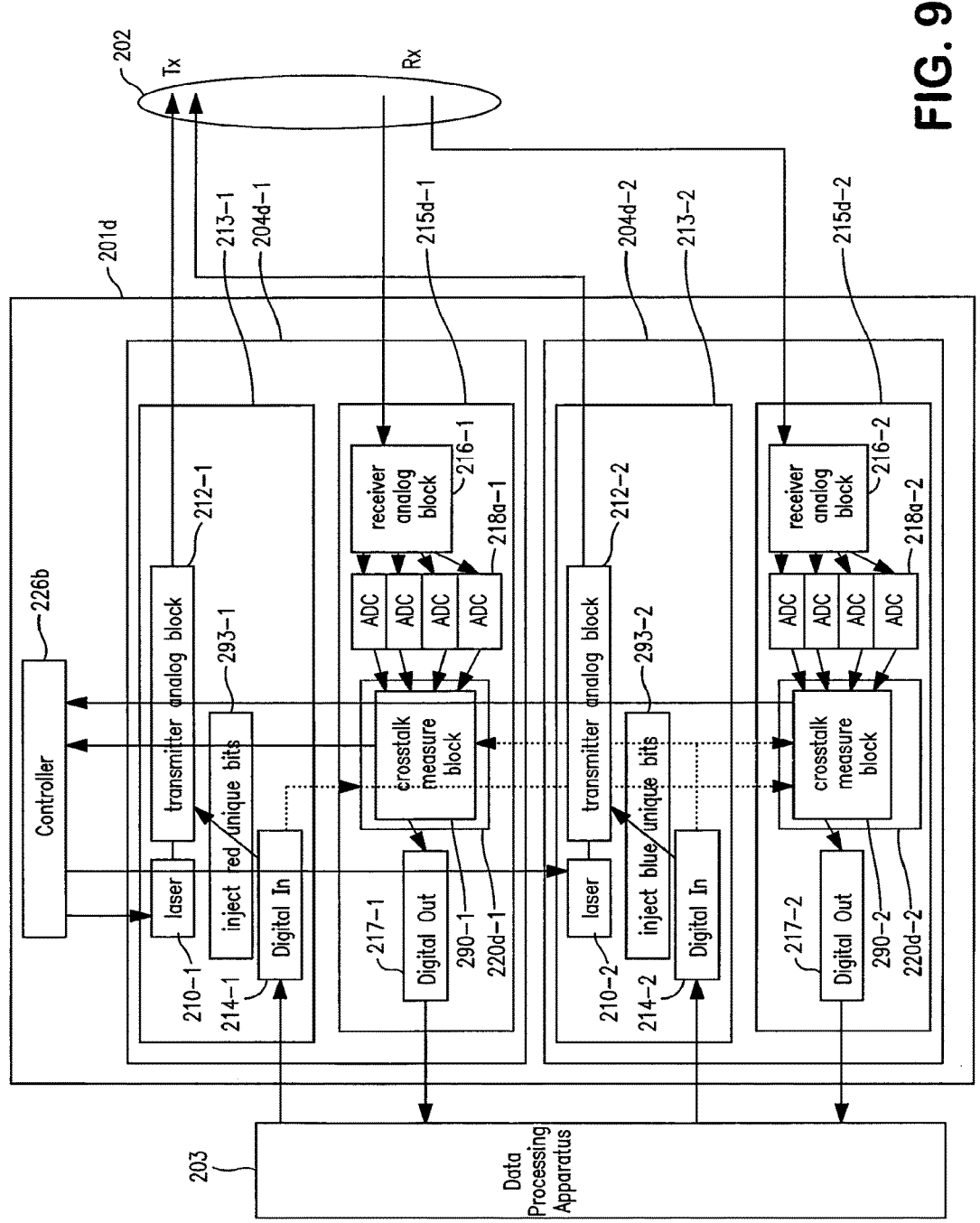
FIG. 9 is a block diagram of an optical modem in accordance with yet one more embodiment of the present invention.

FIG. 9 illustrates yet another embodiment. In this embodiment, the digital receive blocks 220d-1, 220d-2 each include a process 290-1, 290-2 that calculates a direct measurement of the cross-talk which is used as the metric to adjust the laser frequencies. Particularly, a unique predetermined bit sequence 293-1 is injected into the transmitter analog block 212-1 for the first sub-carrier subsystem 204d-1 and a different unique, predetermined bit sequence 293-2 is injected into the transmitter analog block 212-2 of the second sub-carrier subsystem 204d-2. The relative power of each of those unique bit sequences as received in each sub-carrier subsystem is indicative of the level of cross-talk between the two channels. For instance, if there is no cross-talk, then the unique bit sequence 293-1 will not appear at all in sub-carrier subsystem 204d-2, while bit sequence 293-2 will appear in sub-carrier subsystem 204d-2 with relatively strong power. At the opposite extreme, if the two channels overlap completely, then both unique bit sequences 293-1, 293-2 would be received in both sub-carrier subsystems 204d-1, 204d-2 with equal power. The higher the power of the unique bit sequence transmitted from one of the sub-carrier subsystems, as received in the other sub-carrier subsystem, the greater the cross-talk, i.e., the more the two sub-carrier frequency spectrums overlap each other. The controller 226d is configured to adjust the frequency separation of laser 210-1 and/or laser 210-2 responsive to the relative power levels of the unique bit sequences as received in each sub-carrier subsystem.

Having thus described a few particular embodiments of the invention, various alterations, modifications, and improvements will readily occur to those skilled in the art. Such alterations, modifications, and improvements as are made obvious by this disclosure are intended to be part of this description though not expressly stated herein, and are intended to be within the spirit and scope of the invention. Accordingly, the foregoing description is by way of example only, and not limiting. The invention is limited only as defined in the following claims and equivalents thereto.

What is claimed is:

1. A method implemented in a modem for sub-carrier frequency control in a system that uses at least a first sub-carrier frequency and a second sub-carrier frequency, the method comprising:

responsive to receiving signals on each of the first sub-carrier frequency and the second sub-carrier frequency, determining a metric indicative of frequency separation between the first sub-carrier frequency and the second sub-carrier frequency based on digital processing of the signals on each of the first sub-carrier frequency and the second sub-carrier frequency;

controlling a frequency of at least one of the first sub-carrier frequency and the second sub-carrier frequency based on the metric; and processing the received signals on each of the first sub-carrier frequency and the second sub-carrier frequency at a common data processing equipment in the modem.

2. The method of claim 1, wherein the metric is an indicator of cross-talk between the first sub-carrier frequency and the second sub-carrier frequency and is determined digitally.

3. The method of claim 1, wherein the metric is based on one or more of a spectrum measurement, a bit error rate measurement, and a crosstalk measurement.

4. The method of claim 1, wherein the metric is an attenuation at a given selected frequency spacing from a center frequency of one of the first sub-carrier frequency and the second sub-carrier frequency which correlates highly with carrier separation.

5. The method of claim 1, wherein the metric is determined as a function of a plurality of different values.

6. The method of claim 1, wherein the controlling comprises adjusting laser frequencies associated with one or more of the first sub-carrier frequency and the second sub-carrier frequency.

7. The method of claim 1, wherein the system comprises a coherent optical frequency division multiplexed system.

8. A digital processing apparatus in a modem for sub-carrier frequency control, the digital processing apparatus comprising:

circuitry adapted to, responsive to receiving signals on each of the first sub-carrier frequency and the second sub-carrier frequency, determine a metric indicative of frequency separation between the first sub-carrier frequency and the second sub-carrier frequency based on digital processing of each of the first sub-carrier frequency and the second sub-carrier frequency;

circuitry adapted to control a frequency of at least one of the first sub-carrier frequency and the second sub-carrier frequency based on the metric; and circuitry adapted to process the received signals on each of the first sub-carrier frequency and the second sub-carrier frequency at a common data processing equipment in the modem.

9. The digital processing apparatus of claim 8, wherein the metric is an indicator of cross-talk between the first sub-carrier frequency and the second sub-carrier frequency and is determined digitally.

10. The digital processing apparatus of claim 8, wherein the metric is based on one or more of a spectrum measurement, a bit error rate measurement, and a crosstalk measurement.

11. The digital processing apparatus of claim 8, wherein the metric is an attenuation at a given selected frequency spacing from a center frequency of one of the first sub-carrier frequency and the second sub-carrier frequency which correlates highly with carrier separation.

12. The digital processing apparatus of claim 8, wherein the metric is determined as a function of a plurality of different values.

13. The digital processing apparatus of claim 8, wherein the frequency is controlled by adjustment of laser frequencies associated with one or more of the first sub-carrier frequency and the second sub-carrier frequency.

14. The digital processing apparatus of claim 8, wherein the modem comprises a coherent optical frequency division multiplexed modem.

15. A modem adapted for sub-carrier frequency control, the modem comprising:

a first sub-carrier subsystem adapted to receive a first signal on a first sub-carrier frequency;

a second sub-carrier subsystem adapted to receive a second signal on a second sub-carrier frequency;

common data processing equipment adapted to process both the first signal and the second signal; and a controller communicatively coupled to the first sub-carrier subsystem and second first sub-carrier subsystem, wherein the controller is adapted to determine a metric indicative of frequency separation between the first sub-carrier frequency and the second sub-carrier frequency based on digital processing of signals on each of the first sub-carrier frequency and the second sub-carrier frequency, responsive to receiving the signals on each of the first sub-carrier frequency and the second sub-carrier frequency, and control a frequency of at least one of the first sub-carrier frequency and the second sub-carrier frequency based on the metric.

16. The modem of claim 15, wherein the metric is an indicator of cross-talk between the first sub-carrier frequency and the second sub-carrier frequency and is determined digitally.

17. The modem of claim 15, wherein the metric is based on one or more of a spectrum measurement, a bit error rate measurement, and a crosstalk measurement.

18. The modem of claim 15, wherein the metric is an attenuation at a given selected frequency spacing from a center frequency of one of the first sub-carrier frequency and the second sub-carrier frequency which correlates highly with carrier separation.

19. The modem of claim 15, wherein the metric is determined as a function of a plurality of different values.

20. The modem of claim 15, wherein the frequency is controlled by adjustment of laser frequencies associated with one or more of the first sub-carrier frequency and the second sub-carrier frequency.

* * * * *